US006859323B1

(12) United States Patent
Gasloli et al.

(10) Patent No.: US 6,859,323 B1
(45) Date of Patent: Feb. 22, 2005

(54) DICHROIC NEUTRAL DENSITY OPTICAL FILTER

(75) Inventors: Paul J. Gasloli, Santa Rosa, CA (US); Andrew T. Taylor, Santa Rosa, CA (US); Serge J. Bierhuizen, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 10/788,570

(22) Filed: Feb. 27, 2004

Related U.S. Application Data

(60) Provisional application No. 60/529,022, filed on Dec. 11, 2003.

(51) Int. Cl.$^7$ ................................................. G02B 5/28
(52) U.S. Cl. ........................ 359/589; 359/588; 359/577
(58) Field of Search ................................ 359/583, 584, 359/588–589, 577

(56) References Cited

U.S. PATENT DOCUMENTS

| | | | | |
|---|---|---|---|---|
| 3,504,959 A | | 4/1970 | Hennessey | 350/166 |
| 3,981,568 A | * | 9/1976 | Bartolomei | 359/587 |
| 4,659,178 A | * | 4/1987 | Kyogoku | 359/590 |
| 5,200,855 A | | 4/1993 | Meredith, Jr. et al. | 359/588 |
| 5,966,240 A | * | 10/1999 | Lange et al. | 359/583 |
| 6,080,467 A | | 6/2000 | Weber et al. | 428/212 |
| 6,157,490 A | | 12/2000 | Wheatley et al. | 359/589 |
| 6,249,378 B1 | * | 6/2001 | Shimamura et al. | 359/487 |
| 6,451,414 B1 | | 9/2002 | Wheatley et al. | 428/212 |
| 6,531,230 B1 | | 3/2003 | Weber et al. | 428/480 |
| 6,631,033 B1 | | 10/2003 | Lewis | 359/584 |

FOREIGN PATENT DOCUMENTS

| | | | |
|---|---|---|---|
| GB | 2137769 | * 10/1984 | |
| GB | 2137769 A | 10/1984 | G02B/5/28 |

OTHER PUBLICATIONS

*Absorptive Neutral Density Filters*, ThorLabs, Inc., User's Guide, 1–6 (Oct. 25, 2001).

* cited by examiner

*Primary Examiner*—Leo Boutsikaris
(74) *Attorney, Agent, or Firm*—Allen, Dryer, Doppelt, Milbrath & Gilchrist, P.A.

(57) ABSTRACT

An optical thin film stack provides reflection of essentially all light except for a selected amount of transmission over a selected wavelength range. Reflecting, rather than absorbing, unwanted light avoids heating caused by light absorption and allows productive use of the non-transmitted light in some applications. In some embodiments, reflector designs are "stacked" on an optical substrate to provide serial optical reflectors. Stacking dichroic filters provides reduced sensitivity to cone angle and manufacturing advantages.

21 Claims, 5 Drawing Sheets

US 6,859,323 B1

DICHROIC NEUTRAL DENSITY OPTICAL FILTER

CROSS-REFERENCE TO RELATED APPLICATIONS

This utility patent application claims priority from U.S. Provisional Patent Application No. 60/529,022 entitled DICHROIC NEUTRAL DENSITY OPTICAL FILTER, filed Dec. 11, 2003 by Paul J. Gasloli, Andrew T. Taylor, and Serge J. Bierhuizen, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to optical filters, and more specifically to a reflective neutral density optical filter with low transmission over a selected wavelength band.

BACKGROUND OF THE INVENTION

Neutral density ("ND") filters are desirable in many applications. Generally, ND filters uniformly attenuate the intensity of light over a broad spectral range. Attenuation is accomplished by using any one or combination of several techniques. Light-absorbing glass is used in some ND filters, such as in sunglasses and photographic filters. Another type of ND filter uses a partially transparent thin-film metal coating that combines absorption and reflection. Both types of ND filters absorb light, which can cause heating in high light flux applications, as the absorbed light is converted to heat.

Another limitation of an ND filter using dyed glass is that the amount of attenuation is proportional to the amount of dye and the thickness of the glass. In many applications, the amount of dye is fixed, and the thickness of the glass is altered to provide the selected amount of attenuation. If a high degree of attenuation is required, the glass may become undesirably heavy and/or bulky. If a slight degree of attenuation is required, the glass may become undesirably fragile, or require additional support.

Another approach to providing an ND filter is to pattern a reflective metal layer on a dyed or undyed glass substrate. The metal-coated areas reflect a portion of the incident light, and the non-coated (clear) areas transmit another portion of the incident light. The amount of attenuation is controlled by how much of the surface of the filter is covered by the reflective metal layer. However, patterning the reflective metal layer, such as by photoresist lift-off or photoresist etching techniques, adds manufacturing complexity and yield loss. Patterning a reflective metal layer may have other undesirable effects, such as generating interference patterns in the transmitted light (particularly with a clear substrate) or creating an image artifact of the pattern. Finally, the remaining portions of the reflective metal layer can become quite hot in a high-flux environment.

If attenuation over a selected range of wavelengths is desired, a dielectric high-transmission filter is coated with a semi-transparent layer of metal or a patterned layer of metal. However, both techniques suffer the same problems that arise from using metal layers on dyed or plain glass substrates.

Therefore, an ND optical filter that avoids the aforementioned problems is desirable.

BRIEF SUMMARY OF THE INVENTION

An optical filter reflects essentially all light except for transmitting a relatively small amount of light in a selected transmission band. The reflection in the transmission band is uniform, providing a reflective neutral density filter, and allowing the non-transmitted light in the transmission band to be used for other purposes. In some embodiments, an optical filter includes a substrate with a plurality of optical thin film layers disposed on the substrate that are highly reflective (typically greater than 98% average reflection) in two reflection bands, and uniformly reflects between about 96.5% to 50% of the light in a transmission band between the reflection bands. In a particular embodiment, the optical design includes a first reflector stack (e.g. a red reflector stack) on the substrate, and a second reflector stack (e.g. a blue reflector stack) on top of the red reflector. In some embodiments, the reflection in the reflection bands is intentionally degraded to allow "leakage" of light outside the wavelength range of the transmission band.

DETAILED DESCRIPTION OF THE INVENTION

I. Introduction

A thin-film dielectric dichroic ND filter provides selected attenuation over a relatively wide range of wavelengths. Since the ND filter is a dichroic filter, essentially all of the light is reflected or transmitted, avoiding heating of the filter when used in a high-flux application, and allowing the non-transmitted light to be used for other purposes. For example, a dichroic ND filter could be used to sample the light output of a lamp over a relatively wide area in a high-flux application without removing significant light from the system or generating heat in the NT) filter.

Reflective dichroic filters can be bandstop filters, which reflect light over a wavelength band, or edgestop filters, which reflect light having wavelengths above ("short pass") or below ("long pass") a band edge. In other words, a dichroic bandstop filter generally transmits (passes) light outside of the reflective band, a dichroic short pass edgestop filter transmits light having shorter wavelength than the reflective band edge, and a dichrioc long pass edgestop filter transmits light having longer wavelength than the reflective band edge. One way to characterize a bandstop filter is by the filter width (in units of wavelength) at 50% of maximum reflection. Edgestop filters can be similarly characterized by the 50% wavelength, which is the wavelength at which reflection drops to half of the maximum reflection, which is usually about 100%.

II. Exemplary Embodiments

Figure 1:
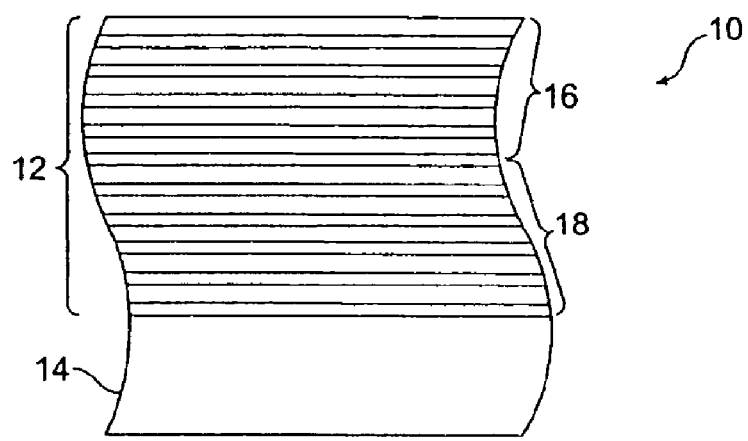
FIG. 1 is a simplified cross section of a portion of a dichroic ND filter according to an embodiment of the present invention.

FIG. 1 is a simplified cross section of a portion of a dichroic ND filter 10 according to an embodiment of the present invention. A stack 12 of thin film layers is formed on a substrate 14. In specific embodiments, optical designs for dichroic filters had 32, 42, and 48 thin film layers, although these numbers of layers are merely exemplary. Generally, it is desirable to use as few thin film layers as possible to minimize deposition times. The substrate is a glass or plastic substrate, for example, and can be clear or dyed; however, in particular embodiments it is clear glass. The thin film layers in the stack generally alternate between a layer of essentially transparent low-index material (such as $SiO_2$) and a layer of essentially transparent high-index material (such as $Ta_2O_5$).

Thin film stacks of transparent dielectric materials are well-known for forming dichroic filters, and a variety of low-index and high-index materials are used in alternative embodiments. "Low" and "high" are relative terms in that the low-index layer is of a material having a lower refractive index than the high-index layer. Some embodiments include a thin film layer or layers of a material having an intermediate, or "medium," index of refraction. Examples of low-index material include magnesium fluoride ($MgF_2$), silicon dioxide ($SiO_2$), and cryolite ($Na_3AlF_6$). Medium-index materials include aluminum oxide ($Al_2O_3$), lanthanum oxide ($La_2O_3$), neodymium oxide ($Nd_2O_3$), yttrium oxide ($Y_2O_3$), and scandium oxide ($Sc_2O_3$). High-index materials include titanium dioxide ($TiO_2$), tantalum pentoxide ($Ta_2O_5$), and zinc sulfide (ZnS). Many other examples of materials exist in each category. In some embodiments, materials that are not transparent in the visible region are used, such as using a very thin layer of silicon or other semiconductor in a visible design, or using a thicker layer of such material in an infrared ("IR") design. Usually, all the low-index layers are made from the same low-index material, and all the high-index layers are made from the same high-index material; however, this is not necessary. If a reflective dichroic ND filter is to be used in an application with high light flux, it is desirable to use materials for the thin film layers that do not absorb the high-flux wavelengths, or to reflect the high-flux wavelengths in the stack before they enter the portion of the stack with potentially absorptive material.

In one embodiment, a first portion 16 of the stack 12 of thin film layers forms a short stop (e.g. blue reflecting) dichroic filter. A second portion 18 of the stack 12 forms a long stop (e.g. red reflecting) dichroic filter. This configuration keeps light having shorter wavelengths (e.g. blue light) from entering the second portion 18 of the stack. Rejecting the shorter wavelengths first reduces ripple in the rejection region of the long stop filter portion. Alternatively, the first portion of the stack forms a long stop dichroic filter. A selected portion of light between the filter edges (e.g. green light) is transmitted through both the first 16 and second 18 portion of the stack 12. In an alternative embodiment, the stack 12 is designed as a band pass dichroic filter, and the designed is optimized to limit transmission in the band pass region so that reflection is between about 50–96.5%.

Figure 2A:
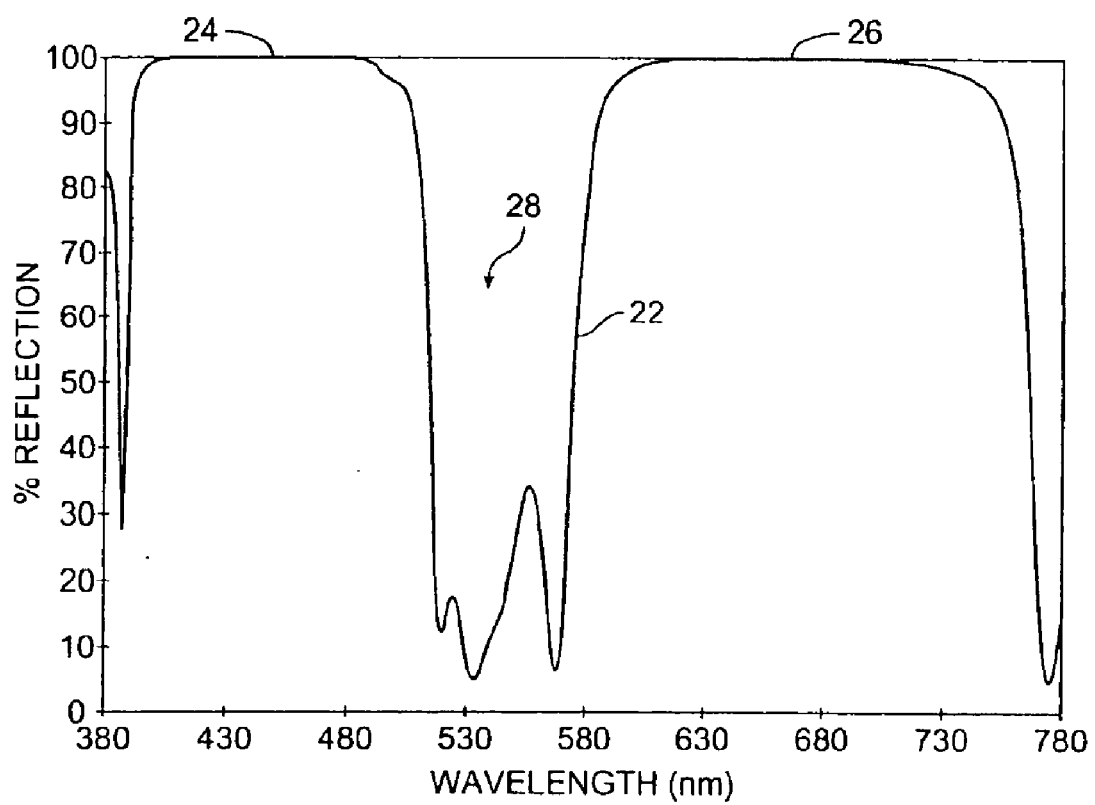
FIG. 2A is plot of the expected filter response (reflection versus wavelength) of a dichroic filter having a short stop dichroic filter on top of a long stop dichroic filter.

FIG. 2A is plot of the expected filter response 22 (reflection versus wavelength) of a dichroic filter having a short stop dichroic filter on top of a long stop dichroic filter. The thin film modeling software was used to generate the predicted wavelength response according to a filter design entered into the modeling software. Examples of thin film optical filter modeling software include OPTILAYER, available from Gary deBell of Los Altos, Calif., and TF CALC from SOFTWARE SPECTRA, INC., of Portland, Oreg. The optical design for the filter modeled in FIG. 2A was:

| Layer# | Material GLASS | Thickness (nm) BULK |
|---|---|---|
| 1 | SIO2 | 57.67 |
| 2 | TA2O5 | 75.22 |
| 3 | SIO2 | 115.35 |
| 4 | TA2O5 | 75.22 |
| 5 | SIO2 | 115.35 |
| 6 | TA2O5 | 75.22 |
| 7 | SIO2 | 115.35 |
| 8 | TA2O5 | 75.22 |
| 9 | SIO2 | 115.35 |
| 10 | TA2O5 | 75.22 |
| 11 | SIO2 | 115.35 |
| 12 | TA2O5 | 75.22 |
| 13 | SIO2 | 115.35 |
| 14 | TA2O5 | 75.22 |
| 15 | SIO2 | 115.35 |
| 16 | TA2O5 | 75.22 |
| 17 | SIO2 | 115.35 |
| 18 | TA2O5 | 75.22 |
| 19 | SIO2 | 115.35 |
| 20 | TA2O5 | 75.22 |
| 21 | SIO2 | 57.67 |
| 22 | TA2O5 | 25.07 |
| 23 | SIO2 | 76.9 |
| 24 | TA2O5 | 50.15 |
| 25 | SIO2 | 76.9 |
| 26 | TA2O5 | 50.15 |
| 27 | SIO2 | 76.9 |
| 26 | TA2O5 | 50.15 |
| 29 | SIO2 | 76.9 |
| 30 | TA2O5 | 50.15 |
| 31 | SIO2 | 76.9 |
| 32 | TA2O5 | 50.15 |
| 33 | SIO2 | 76.9 |
| 34 | TA2O5 | 50.15 |
| 35 | SIO2 | 76.9 |
| 36 | TA2O5 | 50.15 |
| 37 | SIO2 | 76.9 |
| 38 | TA2O5 | 50.15 |
| 39 | SIO2 | 76.9 |
| 40 | TA2O5 | 50.15 |
| 41 | SIO2 | 76.9 |
| 42 | TA2O5 | 25.07 |

The refractive indices used in this and other models were as follows:

| Wavelength | Index |
|---|---|
| SiO2 | |
| 300 | 1.478 |
| 350 | 1.472 |
| 400 | 1.467 |
| 450 | 1.463 |
| 500 | 1.459 |
| 550 | 1.455 |
| 600 | 1.452 |
| 650 | 1.45 |
| 700 | 1.446 |
| 900 | 1.437 |
| 1000 | 1.434 |
| Ta2O5 | |
| 350 | 2.38 |
| 390 | 2.3 |
| 440 | 2.25 |
| 500 | 2.21 |
| 600 | 2.18 |
| 700 | 2.16 |
| 900 | 2.13 |
| 1100 | 2.12 |
| 1500 | 2.05 |

The short stop portion of the dichroic filter (layers 22–42) reflects light in a first (short wavelength) highly reflective portion 24 of the filter response, and the long stop dichroic filter (layers 1–12) reflects light in a second (long wavelength) highly reflective portion 26 of the filter response. The shorter wavelengths are reflected before entering the long stop portion of the thin film stack. The first and second highly reflective portions 24, 26 have essentially complete reflection over their respective portions of the visible spectrum, which is generally considered to be wavelengths from about 400 nm to about 750 nm. A transmissive portion 28 of the filter response has less reflection than the first and second highly reflective portions 24, 26. The reflection in the transmissive portion varies from about 33% to about 5%, not including the transitions between the highly reflective and transmissive region. Since the filter is dichroic, the light that is not reflected is transmitted. In other words, the transmission in the transmissive portion 28 of the filter response varies from about 67% to about 95% ("maximum transmission").

It is generally desirable that ND filters have fairly constant transmission, usually within a few percent, over a selected wavelength range. The optical design of the filter illustrated in FIG. 2A is not optimized for operation as an ND filter because the transmission in the transmissive region fluctuates over the transmissive region. However, ND filters according to embodiments of the invention may have non-flat transmission over the selected ND wavelength range, as discussed in relation to FIGS. 4, 5A, and 5B, below.

Figure 2B:
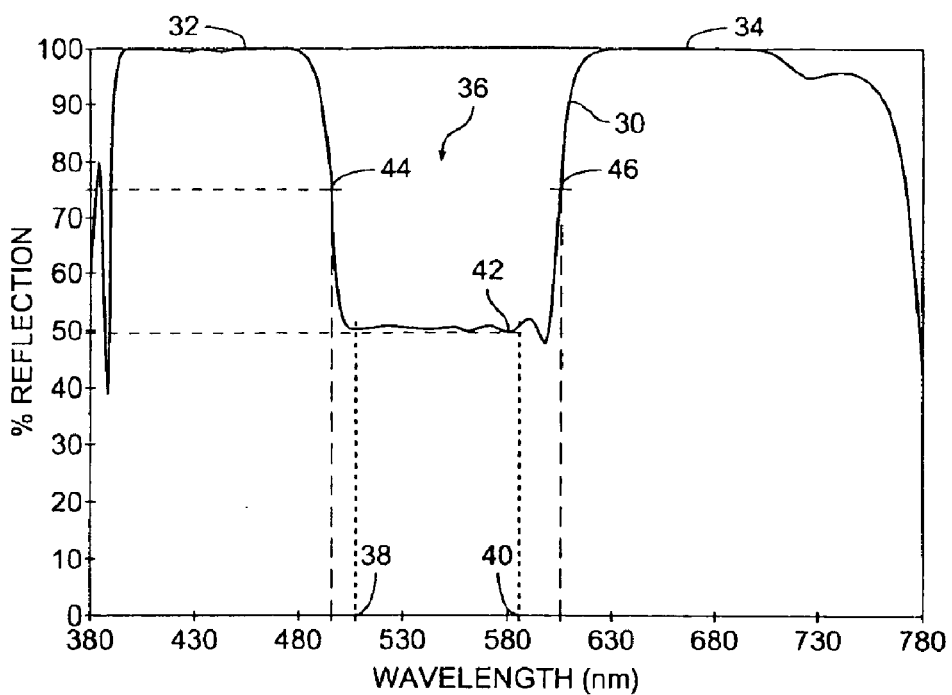
FIG. 2B is a plot of an expected wavelength response for a dichroic ND filter according to an embodiment of the present invention.

FIG. 2B is a plot of an expected wavelength response 30 for a dichroic ND filter according to an embodiment of the present invention. As with the wavelength response for the dichroic filter illustrated in FIG. 2A, this filter response 30 has highly reflective regions 32, 34 in the visible portion of the spectrum and a transmissive region 36 between the highly reflective regions. The transmissive region 36 is similar to a bandpass filter except that transmission is relatively low (about 50%).

Bandpass filters are often characterized by 50% points. The 50% points are the points at which the transmission drops to 50% of the maximum transmission in the selected wavelength range. In this example, the shorter wavelength 38 of the selected wavelength range is about 505 nm, and the longer wavelength 40 of the selected wavelength range is about 585 nm, thus the dichroic ND filter has a selected wavelength range of about 80 nm. The maximum transmission 42 within the selected wavelength range is about 51% (100% 49% reflection). Thus, the 50% points 44,46 occur at a transmission of about 25.5% (reflection of about 74.5%), at wavelengths of about 495 nm and about 605 nm, respectively. The "50% filter width" is about 110 nm. The ripple within the selected wavelength range of 505 nm to 585 nm is less than 1.5%, which is desirably flat for an ND filter. This type of dichroic ND filter is commonly referred to as a 50% filter with a nominal 100 nm wavelength range.

The optical design used to model the filter response of FIG. 2B was a layer design using alternating layers of SiO$_2$ and Ta$_2$O$_5$ on a glass substrate. Generally, many optical designs could be chosen to provide a similar filter response, using a variety of dielectric materials and numbers of layers. This specific optical design is provided only as an example, as are the other optical designs provided below. The optical design modeled in FIG. 2B was:

| Layer# | Material GLASS | Thickness (nm) BULK |
|---|---|---|
| 1 | SIO2 | 110.37 |
| 2 | TA2O5 | 96.42 |
| 3 | SIO2 | 103.73 |
| 4 | TA2O5 | 69.57 |
| 5 | SIO2 | 102.5 |
| 6 | TA2O5 | 65.75 |
| 7 | SIO2 | 106.1 |
| 8 | TA2O5 | 98.5 |
| 9 | SIO2 | 105.43 |
| 10 | TA2O5 | 85.58 |
| 11 | SIO2 | 127.43 |
| 12 | TA2O5 | 88.8 |
| 13 | SIO2 | 101.96 |
| 14 | TA2O5 | 63.37 |
| 15 | SIO2 | 96.28 |
| 16 | TA2O5 | 116.56 |
| 17 | SIO2 | 105.53 |
| 18 | TA2O5 | 77.16 |
| 19 | SIO2 | 94.2 |
| 20 | TA2O5 | 59.11 |
| 21 | SIO2 | 64.62 |
| 22 | TA2O5 | 25.45 |
| 23 | SIO2 | 80.32 |
| 24 | TA2O5 | 48.39 |
| 25 | SIO2 | 0 |
| 26 | TA2O5 | 7.86 |
| 27 | SIO2 | 87.3 |
| 28 | TA2O5 | 55.99 |
| 29 | SIO2 | 82.05 |
| 30 | TA2O5 | 40.49 |
| 31 | SIO2 | 51.2 |
| 32 | TA2O5 | 52.21 |
| 33 | SIO2 | 85.35 |
| 34 | TA2O5 | 55.33 |
| 35 | SIO2 | 83.36 |
| 36 | TA2O5 | 43.37 |
| 37 | SIO2 | 38.73 |
| 38 | TA2O5 | 53.82 |
| 39 | SIO2 | 86.9 |
| 40 | TA2O5 | 59.44 |
| 41 | SIO2 | 56.03 |
| 42 | TA2O5 | 17.2 |

The transition between the long stop (red reflector) portion and the short stop (blue reflector portion) of the dichroic ND filter occurred between layers 21 and 22. In other words, layers 1–21 form a red reflector, and layers 22–42 form a blue reflector. The filter design with the wavelength response shown in FIG. 2A was optimized using TF CALC to obtain the dichroic ND filter design having the wavelength response shown in FIG. 2B.

Figure 2C:
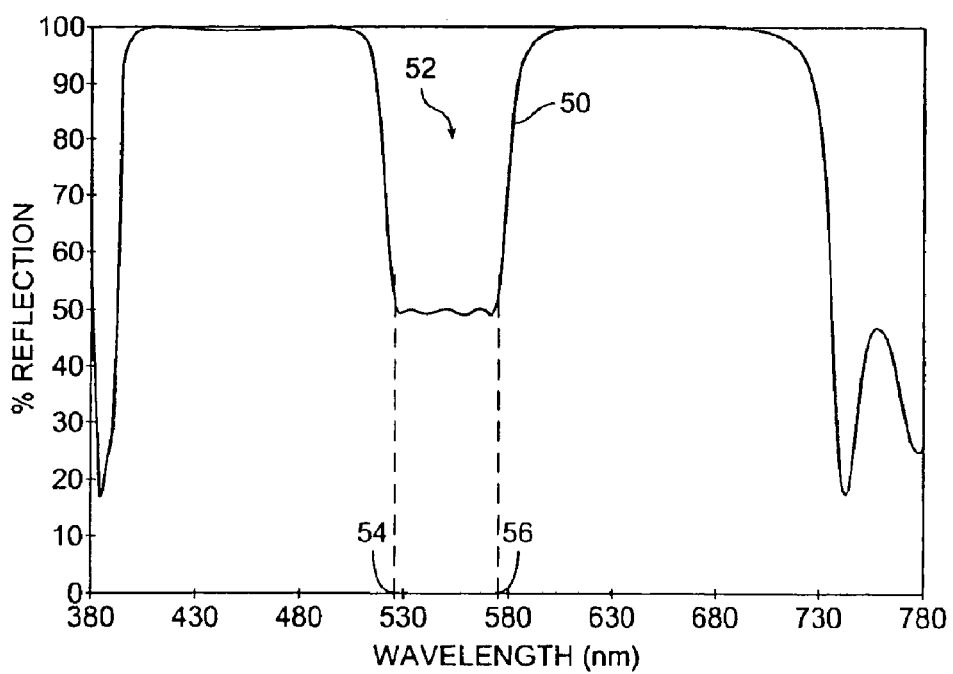
FIG. 2C is a plot of an expected wavelength response for a dichroic ND filter according to another embodiment of the present invention.

FIG. 2C is a plot of an expected wavelength response 50 for a dichroic ND filter according to another embodiment of the present invention. The transmissive region 52 of the dichroic ND filter has about 50% transmission over about 50 nm, and is commonly referred to as a 50% ND filter with a nominal 50 nm wavelength range. The shorter wavelength 54 of the selected wavelength range is about 525 nm and the longer wavelength 56 of the selected wavelength range is about 575 nm. The ripple over the selected wavelength range is less than +2.5%, which is desirable for use of this filter as a dichroic ND filter. The optical design modeled in FIG. 2C was:

| Layer# | Material GLASS | Thickness (nm) BULK |
|---|---|---|
| 1 | SIO2 | 0 |
| 2 | TA2O5 | 88.45 |
| 3 | SIO2 | 133.73 |
| 4 | TA2O5 | 83.25 |
| 5 | SIO2 | 99.66 |
| 6 | TA2O5 | 65.59 |
| 7 | SIO2 | 104.21 |
| 8 | TA2O5 | 76.99 |
| 9 | SIO2 | 119.34 |
| 10 | TA2O5 | 87.88 |
| 11 | SIO2 | 103.15 |
| 12 | TA2O5 | 65.25 |
| 13 | SIO2 | 103.15 |
| 14 | TA2O5 | 71.34 |
| 15 | SIO2 | 100.64 |
| 16 | TA2O5 | 62.38 |
| 17 | SIO2 | 191.45 |
| 18 | TA2O5 | 61.62 |
| 19 | SIO2 | 105.16 |
| 20 | TA2O5 | 72.68 |
| 21 | SIO2 | 96.16 |
| 22 | TA2O5 | 10.02 |
| 23 | SIO2 | 0 |
| 24 | TA2O5 | 48.25 |
| 25 | SIO2 | 83.11 |
| 26 | TA2O5 | 42.88 |
| 27 | SIO2 | 60.06 |
| 28 | TA2O5 | 49.28 |
| 29 | SIO2 | 82.2 |
| 30 | TA2O5 | 51.97 |
| 31 | SIO2 | 78.91 |
| 32 | TA2O5 | 49.69 |
| 33 | SIO2 | 79.69 |
| 34 | TA2O5 | 51.8 |
| 35 | SIO2 | 76.75 |
| 36 | TA2O5 | 44.62 |
| 37 | SIO2 | 69.05 |
| 38 | TA2O5 | 51.26 |
| 39 | SIO2 | 84.07 |
| 40 | TA2O5 | 54.76 |
| 41 | SIO2 | 93.74 |
| 42 | TA2O5 | 10.05 |

Layers 1–21 formed a red reflector, and layers 22–42 formed a blue reflector. Other ND filter embodiments were green bandpass dichroic filters optimized for the desired transmission over the desired wavelength range. The terms "red", "blue", and "green" are used merely as an example for convenience of discussion. Alternative embodiments of dichroic ND filters operate outside of the visible region.

Dichroic ND filters using serial dichroic filter designs have low sensitivity to cone angle. Cone angle is a weighted average of incidence of illumination and is often used to evaluate the performance of thin film optical filters because the cone angle is easily related to an f-number. Alternatively, collimated light illuminating a filter surface at different angles of incidence are used to evaluate the performance of thin film optical filters. TF Calc allows a user to evaluate optical designs as a function of cone angle or as a function of angle of incidence. Optical filter designs that are sensitive to cone angle/angle of incidence often show reflection/transmission spikes, distortion or ripple in the passband, and shifting of the wavelength range as the cone angle or angle of incidence increases.

Dichroic ND filters with low sensitivity to cone angle are particularly desirable in applications where incident light might come from several directions, either simultaneously or sequentially, or where the filter will be used off-axis from its design. Modeling of dichroic ND filters according to embodiments of the invention show stable optical performance for f-numbers greater than 10 to as low as 1 (with 10 being essentially collimated light and 1 being a high cone angle).

Dichroic ND filters using serial reflective filter designs (e.g. a short stop filter deposited on top of a long stop filter) offer manufacturing advantages. For example, the thin film deposition process (e.g. deposition rate, vacuum level, and deposition times) for the layers used in the stack can be determined for the first reflector stack, and modified to deposit the second reflector stack. This is desirable because a single reflector stack has fewer layers than the total design. Process characterization for optical designs modified from a band pass filter design, which typically have many more layers than a long stop filter design, may be more time consuming.

Figure 3A:
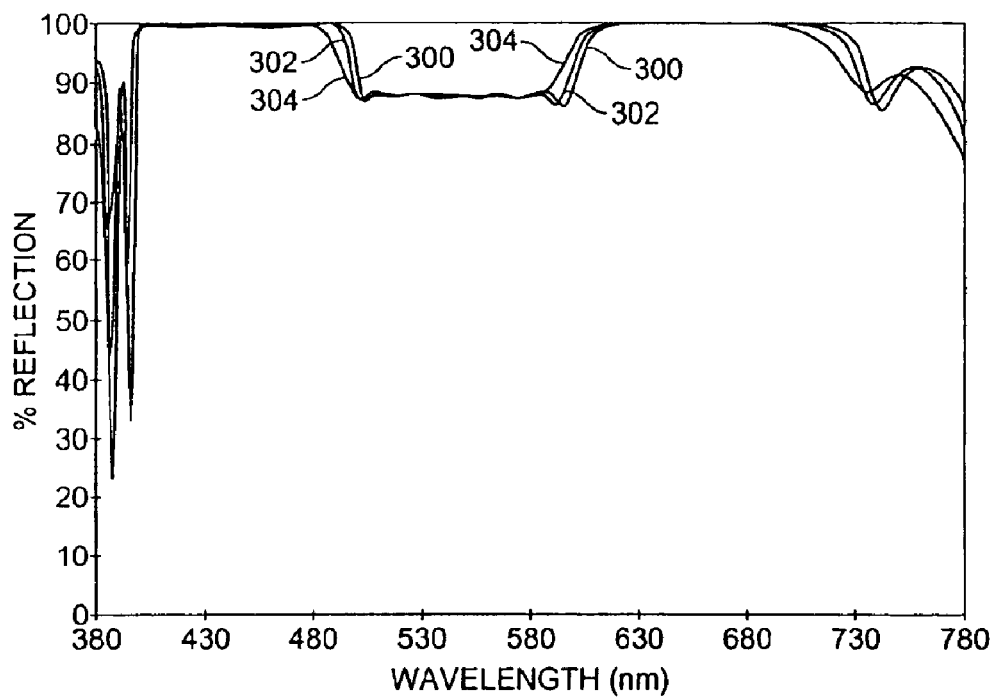
FIG. 3A shows a series of calculated reflection plots for a dichroic ND filter model having nominally 12% in-band transmission for different cone angles.

FIG. 3A shows a series of calculated reflection plots for a dichroic ND filter model having nominally 12% in-band transmission for different cone angles. A first curve 300 is for a cone angle of f/10.0. A second curve 302 is for a cone angle of f/2.0, and a third curve 304 is for a cone angle of f/1.0. These reflection plots show that the transmission and wavelength range of the filter does not significantly vary between f/1.0 and f/10.0. Similarly, although the filter response shifts down range, the ripple within the transmissive portion of the wavelength response remains very flat. The optical design used in the filter design modeled in FIG. 3A was:

| Layer# | Material GLASS | Thickness (nm) BULK |
|---|---|---|
| 1 | SIO2 | 115.75 |
| 2 | TA2O5 | 95.06 |
| 3 | SIO2 | 103.88 |
| 4 | TA2O5 | 101.69 |
| 5 | SIO2 | 101.87 |
| 6 | TA2O5 | 69.48 |
| 7 | SIO2 | 138.47 |
| 8 | TA2O5 | 71.97 |
| 9 | SIO2 | 145.98 |
| 10 | TA2O5 | 67.28 |
| 11 | SIO2 | 97.22 |
| 12 | TA2O5 | 113.09 |
| 13 | SIO2 | 101.59 |
| 14 | TA2O5 | 75.99 |
| 15 | SIO2 | 105.05 |
| 16 | TA2O5 | 62.6 |
| 17 | SIO2 | 96.29 |
| 18 | TA2O5 | 73.72 |
| 19 | SIO2 | 119.36 |
| 20 | TA2O5 | 64.02 |
| 21 | SIO2 | 103.4 |
| 22 | TA2O5 | 85.49 |

-continued

| Layer# | Material GLASS | Thickness (nm) BULK |
|---|---|---|
| 23 | SIO2 | 92.59 |
| 24 | TA2O5 | 55.47 |
| 25 | SIO2 | 79.59 |
| 26 | TA2O5 | 45.59 |
| 27 | SIO2 | 70.72 |
| 28 | TA2O5 | 49.31 |
| 29 | SIO2 | 81.7 |
| 30 | TA2O5 | 52.77 |
| 31 | SIO2 | 83.38 |
| 32 | TA2O5 | 52.47 |
| 33 | SIO2 | 81.34 |
| 34 | TA2O5 | 50.49 |
| 35 | SIO2 | 74.13 |
| 36 | TA2O5 | 43.61 |
| 37 | SIO2 | 70.81 |
| 38 | TA2O5 | 49.84 |
| 39 | SIO2 | 80.78 |
| 40 | TA2O5 | 51.57 |
| 41 | SIO2 | 119.62 |
|  | AIR | BULK |

Figure 3B:
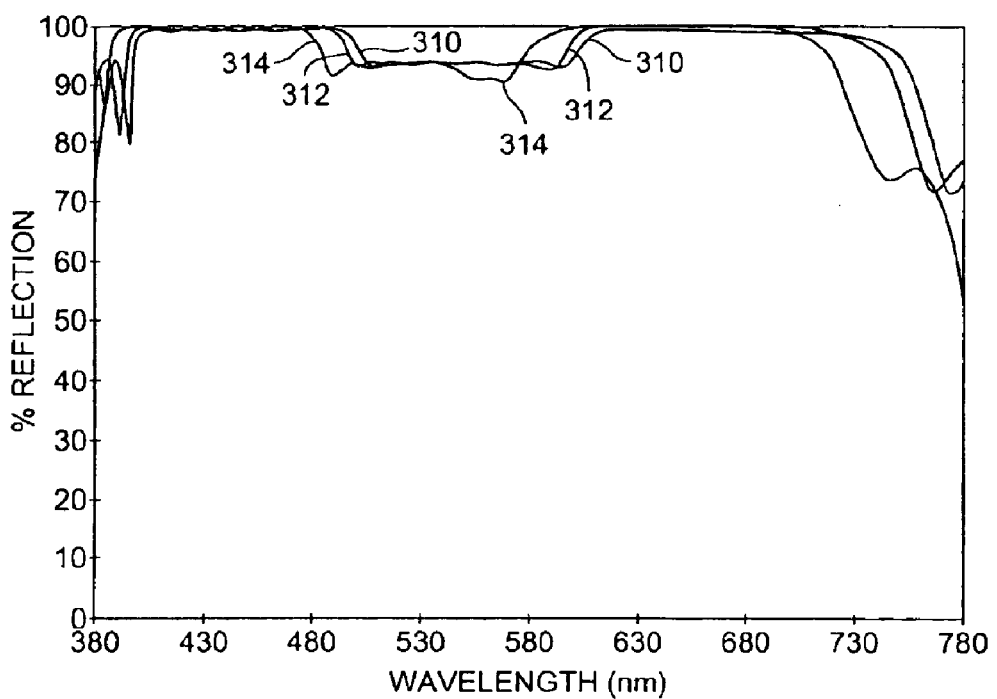
FIG. 3B shows a series of calculated reflection plots for a dichroic ND filter model having nominally 6% in-band transmission for different angles of incidence.

FIG. 3B shows a series of calculated reflection plots for a dichroic ND filter model having nominally 6% in-band transmission for different angles of incidence. A first curve 310 is for an angle of 0 degrees (i.e. perpendicular to the filter), a second curve 312 is for light at an angle of 15 degrees, and a third curve 314 is for an angle of 30 degrees. In this design the in band ripple increases significantly for light incident at 30 degrees. However, this filter design provides relatively low transmission of 6% over a wide nominal wavelength range of 100 nm over angles of incidence from 0 to 15 degrees. The optical filter design modeled in FIG. 3B was:

| Layer | Material GLASS | Thickness BULK |
|---|---|---|
| 1 | SIO2M | 102.92 |
| 2 | NB2O5B | 74.87 |
| 3 | SIO2M | 152.22 |
| 4 | NB2O5B | 70.12 |
| 5 | SIO2M | 113.38 |
| 6 | NB2O5B | 65.45 |
| 7 | SIO2M | 106.7 |
| 8 | NB2O5B | 85.84 |
| 9 | SIO2M | 104.36 |
| 10 | NB2O5B | 76.17 |
| 11 | SIO2M | 106.99 |
| 12 | NB2O5B | 65.49 |
| 13 | SIO2M | 132.18 |
| 14 | NB2O5B | 64.22 |
| 15 | SIO2M | 97.53 |
| 16 | NB2O5B | 63.91 |
| 17 | SIO2M | 102.44 |
| 18 | NB2O5B | 56.53 |
| 19 | SIO2M | 86.19 |
| 20 | NB2O5B | 47.28 |
| 21 | SIO2M | 75.79 |
| 22 | NB2O5B | 45.63 |
| 23 | SIO2M | 81.52 |
| 24 | NB2O5B | 48.92 |
| 25 | SIO2M | 82.22 |
| 26 | NB2O5B | 46.48 |
| 27 | SIO2M | 71.55 |
| 28 | NB2O5B | 41.38 |
| 29 | SIO2M | 65.94 |
| 30 | NB2O5B | 39.12 |
| 31 | SIO2M | 63.03 |
| 32 | NB2O5B | 44.23 |

-continued

| Layer | Material GLASS | Thickness BULK |
|---|---|---|
|  | SIO2M | 0 |
|  | AIR | BULK |

A dichroic ND filter was fabricated according to the design modeled in FIG. 3B. Niobium oxide was used as the materials in the high-index layers instead of titanium oxide. The wavelength response of the filter was measured at normal incidence.

Figure 3C:
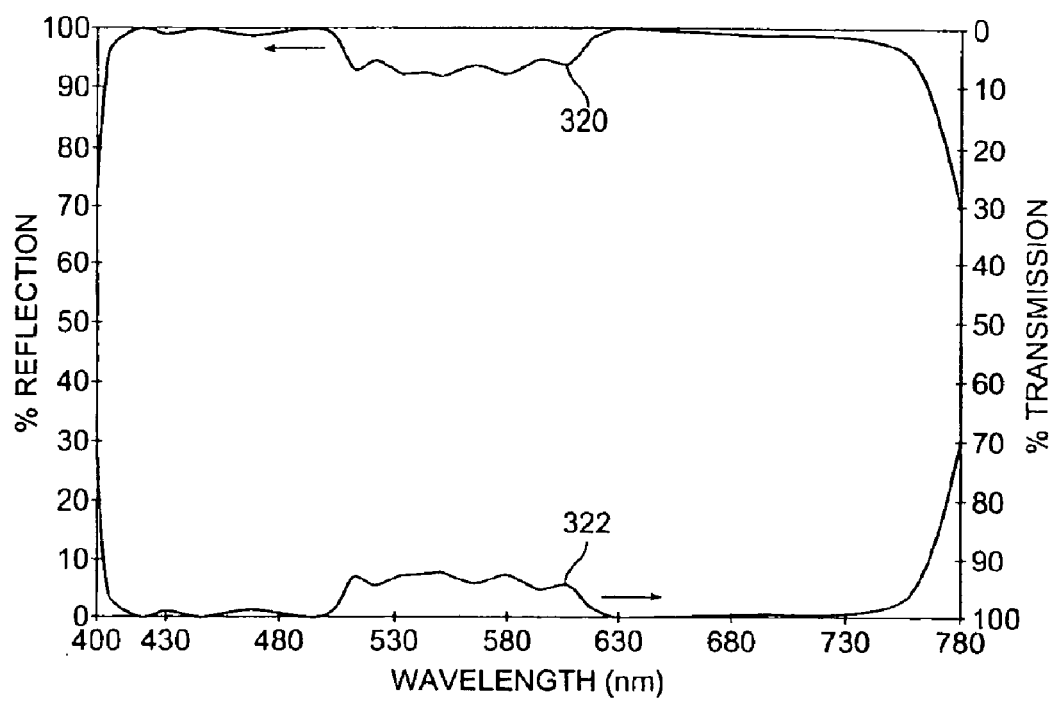
FIG. 3C shows measured reflection and transmission of a dichroic ND filter built according to the optical design of FIG. 3B.

FIG. 3C shows measured reflection and transmission of a dichroic ND filter built according to the optical design of FIG. 3B. A first curve 320 shows reflection (referenced to the left-hand axis) and a second curve 322 shows transmission (referenced to the right-hand axis). The reflection and transmission add up to essentially 100% for the dichroic ND filter. In other words, light that is not reflected is transmitted with negligible absorption. The ripple in the transmissive region is about +1.2%, which is about +20% of the nominal (average) transmission of 6%. Dichroic ND filters were designed with even lower nominal transmission. For dichroic ND filters having a nominal transmission less than about 5% it is often desirable to reference the flatness to the nominal transmission in the selected wavelength range. For dichroic ND filters having a nominal transmission greater than about 5% the flatness can be expressed otherwise, such as from a maximum transmission or as a percent reflection.

The filter designs represented in FIGS. 3A and 3B each have a wavelength range of about 100 nm; however, the wavelength range and reflection of ND dichroic filters is selectable to provide a wide range of dichroic ND filter designs. Dichroic ND filters were designed having ND factors from 0.3 (about 50% transmission) to 1.5 (about 3.5% transmission) with wavelength ranges of about 25 run to about 100 nm. Other embodiments have ND factors that are higher or lower, and wavelength ranges that are greater or lesser.

There is a concept used in the field of optics known as the "just noticeable color difference" ("JNCD"). The JNCD is the point at which a typical human observer will notice a difference in the color between two objects, and is quantified according a color difference equation developed by Friele, MacAdam and Chickering (generally referred to as the FMC equation or JND equation). The FMC equation was developed from test results based on just-noticeable-difference, and hence was originally somewhat subjective, but is used in many fields to compare colors. A JNCD depends on many factors, such as hue, chromaticity, and lightness, and accounts for the photopic response of the human eye, which is most sensitive to green light, about $\frac{1}{3}^{rd}$ as sensitive to red light, and about $\frac{1}{10}$th as sensitive to blue light. A JNCD of 1 is a good color match and typically barely perceptible. Changes of JNCD are typically represented as E. When switching ND dichroic filters with different amounts of transmission in and out (e.g. dichroic ND filters having different ND factors), it is often desirable that the perceived color remains essentially the same.

In some applications it is desirable to provide a series of dichroic ND filters with different ND factors. One approach is to hold the wavelength range of the dichroic ND filters essentially constant and modify the amount of light transmitted in the transmission band. Alternatively, embodiments of dichroic ND filters have a narrower or wider wavelength range and a transmission selected to provide essentially the same color as a standard dichroic ND filter. For example, a nominal (reference) dichroic ND filter might have a wavelength range of 100 nm and a nominal transmission between 6%–12%. Another application might use a dichroic ND filter that is 50 nm wide and has a nominal transmission between 13% and 25%, or use a dichroic ND filter that is 25 nm wide and has a nominal transmission between 26% and 50%.

Several different dichroic ND filters were modeled to evaluate how JNCD is affected by differences in transmission and in wavelength range. An ND dichroic filter having a wider wavelength range and lower transmission can have essentially the same color as a filter having a narrower wavelength range and a higher transmission, especially at low levels of light. The color difference converges at low levels of light occurs because the eye's ability to distinguish between colors diminishes as light decreases (a common example is colors fading to shades of gray at twilight). It is not necessary to preserve 50% points (filter width) to achieve a similar ND effect over a given wavelength range. In particular, some dichroic ND filters have 50% points inside the wavelength range.

Figure 4:
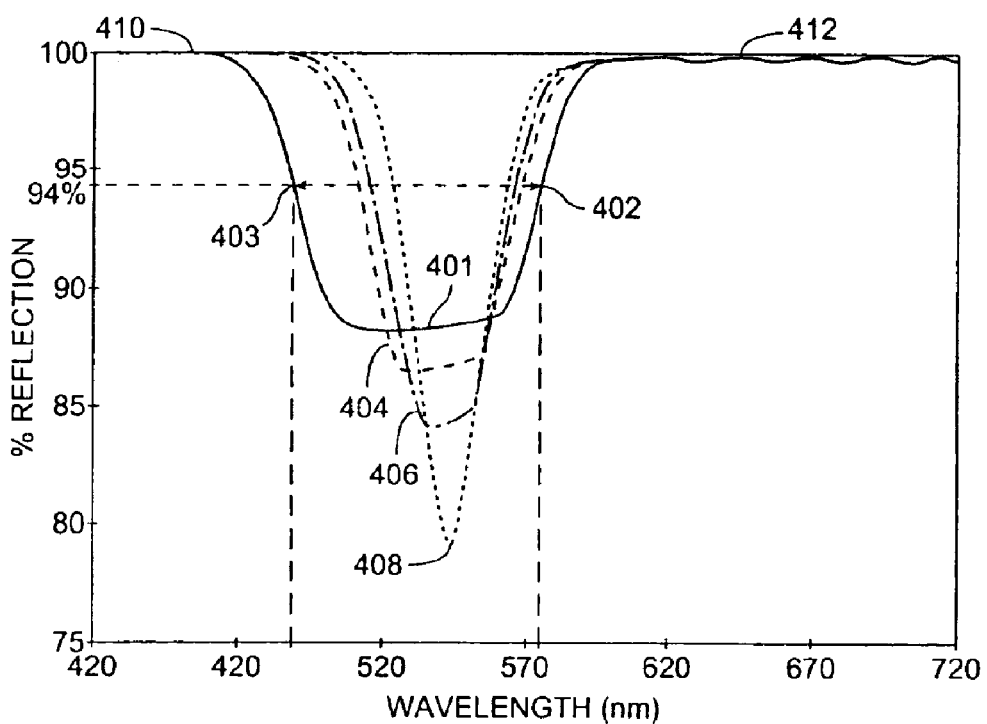
FIG. 4 shows a family of calculated reflection plots for dichroic ND filters having a variety of wavelength responses.

FIG. 4 shows a family of modeled reflection plots for dichroic ND filters having a variety of wavelength responses. Each dichroic ND filter design provided essentially the same expected intensity as a reference dichroic ND filter, represented by a first plot 401. The first plot 401 shows the modeled reflection characteristic for a dichroic ND filter having a minimum reflection of about 88%. The 50% points 402, 403 occur at a reflection of 94%, and the 50% width is about 84 nm (574 nm–490 nm). The second plot 404 has a 50% width of about 50 nm and a minimum reflection of about 86.25%. The third plot 406 has a 50% width of about 40 nm and a minimum reflection of about 84%, and the fourth plot 408 has a 50% width of about 30 nm and a minimum reflection of about 79.5%.

Each dichroic ND filter was modeled to have 100% reflection in the highly reflective regions 410, 412. The upper (longer wavelength) band edges of the transmission bands were shifted from the upper band edge of the reference dichroic ND filter 401 to center the transmission bands to provide a low E in the transmission region. It was found that the JNCD of the filter designs were more sensitive to the high pass side of the transmission bands than to the low pass side, and that E for the most narrow dichroic ND filter design 408 was 6.0. It is believed that this relatively high E arises because the transmitted color becomes more saturated (i.e. "purer"), as well as greater in intensity, as the filter width and minimum reflectivity of the dichroic ND filter are reduced.

Long stop and short stop optical filters are typically designed to have essentially complete reflection in the highly reflective region 410, 412. Transmission of wavelengths in the highly reflective regions are suppressed because they are completely reflected. Embodiments of dichroic ND filters have a selected amount of transmission ("leakage") of light in the highly reflective regions (i.e. outside the selected wavelength range) of the dichroic ND filter. It was found that dichroic ND filters having a narrower filter width could provide the same perceived intensity and low E by selectively allowing leakage of light in the highly reflective regions of the wavelength response. It is believed that selectively allowing leakage of light outside the transmission band of the dichroic ND filter essentially dilutes the color saturation of relatively narrow, high transmission dichroic ND filters.

Figure 5A:
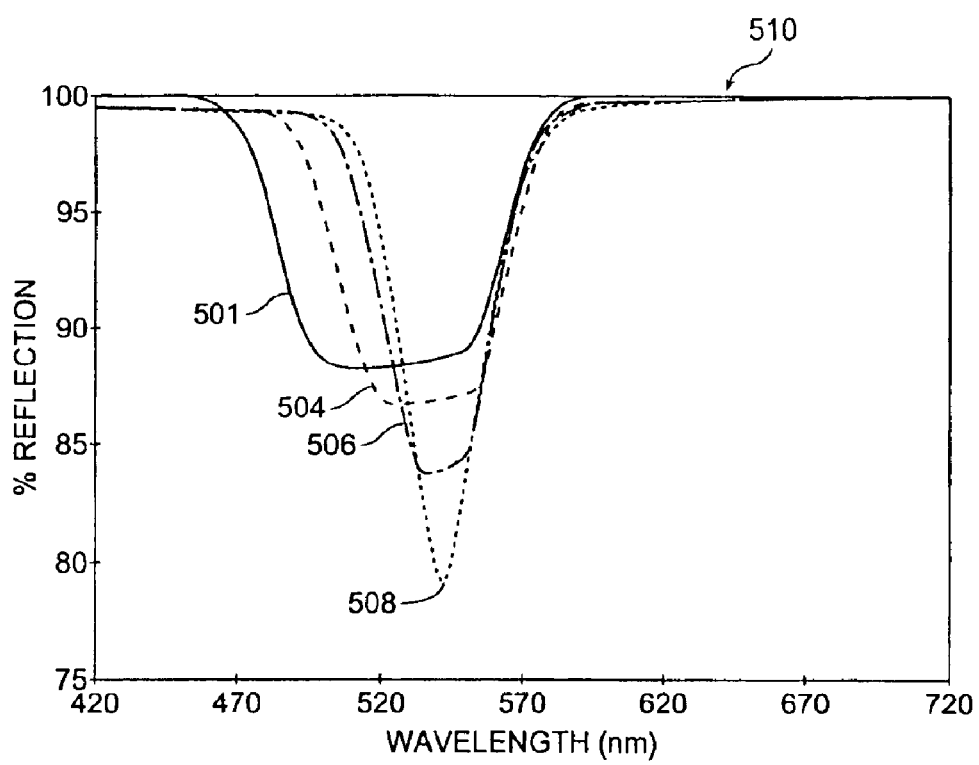
FIG. 5A shows a family of calculated reflection plots for dichroic ND filters for a variety of dichroic ND filter designs.

FIG. 5A shows a family of calculated reflection plots for a variety of dichroic ND filters having different filter designs. The filter designs are similar to the filter designs modeled in FIG. 4, except selected leakage in the highly reflective regions was designed into the dichroic ND filters. Adding a selected amount of leakage significantly lowered the Es between different dichroic ND filter designs. A first plot 501 represents the wavelength response of a reference dichroic ND filter. A second plot 504 represents the wavelength response of a dichroic ND filter with the long wavelength 50% point shifted 8 nm down scale from the long wavelength 50% point of the reference dichroic ND filter, and a selected leakage of 0.49% in the long stop portion 510 of the dichroic ND filter response. A third plot 506 represents the wavelength response of a dichroic ND filter with the long wavelength 50% point shifted 14 nm down scale and a selected leakage of 0.61% in the long stop portion 510 of the dichroic ND filter response. A fourth plot 508 represents the wavelength response of an dichroic ND filter with the long wavelength 50% point shifted 18 nm down scale and a selected leakage of 0.61% in the long stop portion 510 of the dichroic ND filter response. The dichroic ND filter designs have Es in the range of 0.0–0.5, which is a significant improvement over the color matches (to the reference dichroic ND filter) obtained in the filter designs represented in FIG. 4.

Figure 5B:
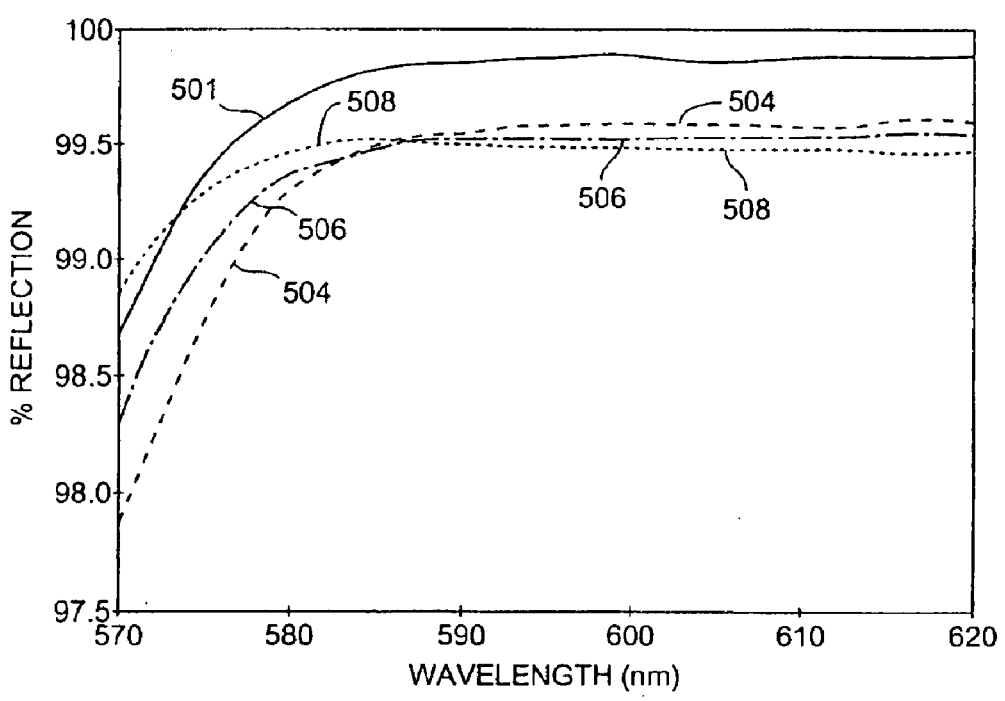
FIG. 5B shows the family of reflective plots shown in FIG. 5A on an expanded reflection scale.

FIG. 5B shows the family of calculated reflective plots shown in FIG. 5A on an expanded reflection scale. The reflection plots 501, 504, 506, 508 have lower reflection (i.e. greater leakage) above 580 nm than the reference dichroic ND filter 501. A selected amount of broad-band leakage (transmission) between about 0.25% and 1.5% in the highly reflective region(s) of a dichroic ND filter is desirable to stabilize the perceived color point of the dichroic ND filter. Low levels of leakage are useful to adjust the color point of dichroic ND filters having low transmission, but in such applications control of the 50% width is often adequate because of the relatively low intensity of light provided through the transmission band. High levels of leakage are useful to adjust the color of relatively narrow ND dichroic filters having high transmission. Leakage in the red portion of the spectrum has a greater effect in diluting green light because the human eye is more sensitive to red light than to blue light.

The specific wavelengths and amounts of leakage are merely exemplary. In alternative embodiments, the shorter wavelength band edge of the dichroic ND filter wavelength range may be more relevant. In this example, the red region of the spectrum was illustrated because the human eye is more responsive to red light than to blue light. In some embodiments, the leakage in the longer and shorter wavelength reflective regions may be essentially the same, and in others the leakage may be different. The preferred optical design of a dichroic ND filter can depend on many factors, such as the light spectrum from the illuminant (light source). For example, if the intensity versus wavelength of the output spectrum of a lamp slopes, a slope may be added to the transmission band of an ND dichroic filter design to compensate for the variation in illumination from the lamp.

Dichroic ND filters having selected leakage may be easier to design and build because fewer layers are needed if leakage is acceptable. Leakage is typically undesirable, and conventional long stop and short stop filters typically have more layers to achieve nearly complete suppression (essentially no leakage). Utilizing selected leakage in dichroic ND filter designs may also allow wider tolerances on the 50% points of the transmission band, thus simplifying manufacture and increasing yields.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

We claim:

1. A dichroic neutral density optical filter comprising:
   a substrate;
   a plurality of dielectric thin film layers disposed on the substrate to provide a wavelength response of the dichroic neutral density filter having
   a first highly reflective region,
   a second highly reflective region, and
   a transmissive region between the first highly reflective region and the second highly reflective region having a selected neutral density transmission across a selected wavelength range of at least about 25 nm, wherein the average transmission is between 50% and 3.5%.

2. The dichroic neutral density optical filter of claim 1 wherein transmission in the selected wavelength range has less than +20% ripple relative to an average transmission of the selected wavelength range.

3. The dichroic neutral density optical filter of claim 1, wherein the selected neutral density transmission is at least 5% and transmission over the selected wavelength range varies less than +2.5%.

4. The dichroic neutral density optical filter of claim 1, wherein the selected wavelength range is within a visible spectrum.

5. The dichroic neutral density optical filter of claim 4, wherein at least one of the first highly reflective region and the second highly reflective region is in the visible spectrum.

6. The dichroic neutral density optical filter of claim 5, wherein at least one of the first highly reflective region and the second highly reflective region is about 100 nm wide.

7. The dichroic neutral density optical filter of claim 5, wherein each of the first highly reflective region and the second highly reflective region is greater than 100 nm wide in the visible spectrum.

8. The dichroic neutral density optical filter of claim 7, wherein the selected wavelength range is about 100 nm wide.

9. The dichroic neutral density optical filter of claim 7, wherein the selected wavelength range is at least 50 nm wide.

10. The dichroic neutral density optical filter of claim 1, wherein the selected wavelength range is about 100 nm wide.

11. The dichroic neutral density optical filter of claim 9, wherein the selected neutral-density transmission is between about 6% to about 12% in a green portion of the visible spectrum.

12. The dichroic neutral density optical filter of claim 1, wherein the plurality of dielectric thin film layers includes a first portion comprising a long stop filter and a second portion comprising a short stop filter.

13. The dichroic neutral density optical filter of claim 12, wherein the long stop filter is disposed between the substrate and the short stop filter.

14. The dichroic neutral density optical filter of claim 13 wherein the short stop filter is a blue reflective filter and the long stop filter is a red reflective filter.

15. The dichroic neutral density optical filter of claim 1 wherein the transmissive region has a 500 width that is less than the selected wavelength range.

16. The dichroic neutral density optical filter of claim 15 wherein at least one of the first highly reflective region and the second highly reflective region has a selected leakage between about 0.25% and 1.54.

17. The dichroic neutral density optical filter of claim 15 wherein the first highly reflective region has a selected leakage between about 0.25% and 1.5% in a red portion of a spectrum.

18. The dichroic neutral density optical filter of claim 1, wherein at least one of the first highly reflective region and the second highly reflective region has a selected leakage between about 0.25% and 1.5%.

19. The dichroic neutral density optical filter of claim 18, wherein the first highly reflective region has a first selected leakage between about 0.25% and about 1.5% and the second highly reflective region has a second selected leakage between about 0.25% and about 1.5%.

20. The dichroic neutral density optical filter of claim 15, wherein the 50% width and a center wavelength between 50% points of the transmissive region are selected according to a spectral output of an illuminant.

21. A dichroic neutral density optical filter comprising:
   means for reflecting essentially all light over a first portion of a visible spectrum;
   means for reflecting between 96.5% and 50% of light over a second portion of the spectrum, the second portion of the spectrum being at least 25 n=wide and providing a neutral density factor between 0.3 and 1.5; and
   means for reflecting essentially all light over a third portion of the visible spectrum, wherein the second portion of the visible spectrum is between the first portion and the third portion.

* * * * *

UNITED STATES PATENT AND TRADEMARK OFFICE
CERTIFICATE OF CORRECTION

PATENT NO. : 6,859,323 B1
DATED : February 22, 2005
INVENTOR(S) : Gasloli et al.

It is certified that error appears in the above-identified patent and that said Letters Patent is hereby corrected as shown below:

Column 3,
Line 5, "in the NT) filter." should read -- in the ND) filter. --.

Column 10,
Line 37, "about 25 run" should read -- about 25 nm --.

Column 14,
Line 43, "at least 25 n=wide" should read -- at least 25 nm wide --.

Signed and Sealed this

Fifteenth Day of November, 2005

JON W. DUDAS
*Director of the United States Patent and Trademark Office*